US012766525B2

(12) United States Patent
Edwall et al.

(10) Patent No.: US 12,766,525 B2
(45) Date of Patent: Oct. 20, 2026

(54) CENTRIFUGAL SEPARATOR AND PROTECTIVE MEMBER

(71) Applicant: Alfa Laval Corporate AB, Lund (SE)

(72) Inventors: Johan Edwall, Nyköping (SE); Lars Klein, Norsborg (SE)

(73) Assignee: ALFA LAVAL CORPORATE AB, Lund (SE)

( * ) Notice: Subject to any disclaimer, the term of this patent is extended or adjusted under 35 U.S.C. 154(b) by 489 days.

(21) Appl. No.: 18/280,076

(22) PCT Filed: Feb. 18, 2022

(86) PCT No.: PCT/EP2022/054051

§ 371 (c)(1), (2) Date: Sep. 1, 2023

(87) PCT Pub. No.: WO2022/194487

PCT Pub. Date: Sep. 22, 2022

(65) Prior Publication Data

US 2024/0066529 A1 Feb. 29, 2024

(30) Foreign Application Priority Data

Mar. 17, 2021 (EP) .................................... 21163064

(51) Int. Cl.
*B04B 1/12* (2006.01)
*B04B 7/12* (2006.01)

(52) U.S. Cl.
CPC . *B04B 1/12* (2013.01); *B04B 7/12* (2013.01)

(58) Field of Classification Search
CPC .................................... B04B 1/12; B04B 7/12
(Continued)

(56) References Cited

U.S. PATENT DOCUMENTS 4,519,496 A 5/1985 Ludvigsen
7,247,133 B2 * 7/2007 Gronnegaard ............ B04B 1/20 494/53
(Continued)

FOREIGN PATENT DOCUMENTS

CN 1726084 A 1/2006
CN 205761838 U 12/2016
(Continued)

OTHER PUBLICATIONS

"Erosion Liner", Feb. 19, 2009, XP055829834, non-patent literature cited during opposition proceedings against a European patent.
(Continued)

*Primary Examiner* — Claire X Wang
*Assistant Examiner* — Shuyi S. Liu
(74) *Attorney, Agent, or Firm* — Birch, Stewart, Kolasch & Birch, LLP

(57) ABSTRACT

A centrifugal separator includes a separator bowl delimiting therein a separation space and being configured to rotate about a rotational axis and nozzle members arranged peripherally at the separator bowl. Each nozzle member forms a nozzle outlet providing a passage from the separation space to a space outside the separator bowl. The centrifugal separator includes a protective member arranged downstream of each nozzle outlet at an outer periphery of the separator bowl. The nozzle member secures the protective member in relation to the separator bowl, at least in one circumferential direction of the separator bowl.

20 Claims, 6 Drawing Sheets

(58) Field of Classification Search
USPC ................................................ 494/56, 67, 70
See application file for complete search history.

(56) References Cited

U.S. PATENT DOCUMENTS

| | | | | |
|---|---|---|---|---|
| 2006/0166803 | A1* | 7/2006 | Schulz | B04B 1/12 494/56 |
| 2018/0008990 | A1 | 1/2018 | Mengle | |
| 2018/0015562 | A1 | 1/2018 | Denzer | |

FOREIGN PATENT DOCUMENTS

| | | | |
|---|---|---|---|
| CN | 205868566 | U | 1/2017 |
| CN | 107206434 | A | 9/2017 |
| CN | 207446527 | U | 6/2018 |
| CN | 109311029 | A | 2/2019 |
| CN | 212215910 | U | 12/2020 |
| EP | 0 081 938 | A2 | 6/1983 |
| EP | 0 081 938 | A3 | 8/1984 |
| EP | 1 572 371 | B2 | 12/2019 |
| WO | WO 2004/054719 | A1 | 7/2004 |
| WO | WO 2016/119809 | A1 | 8/2016 |
| WO | WO 2017/165631 | A1 | 9/2017 |

OTHER PUBLICATIONS

International Search Report, issued in PCT/EP2022/054051, dated May 19, 2022.
Written Opinion of the International Searching Authority, issued in PCT/EP2022/054051, dated May 19, 2022.

* cited by examiner

CENTRIFUGAL SEPARATOR AND PROTECTIVE MEMBER

TECHNICAL FIELD

The invention relates to a centrifugal separator and to a protective member for a centrifugal separator.

BACKGROUND

A high-speed centrifugal separator may be configured for separating a sludge phase from a liquid mixture. The sludge phase may have a solid matter content. The separator bowl of such a centrifugal separator may be provided with nozzles for discharging the sludge phase. The nozzles are arranged at an outer periphery of the separator bowl.

If the sludge phase contains erosive or abrasive solid matter, the separator bowl outer surface may be subjected to wear at the nozzles. Restoring a worn separator bowl is a costly operation. Accordingly, the separator bowl may be protected by exchangeable wear protection members.

EP 1572371 discloses a centrifugal a separator, comprising a centrifugal basket/bowl that has a basket shell provided with solids discharge nozzles. A wear protection system including wear protection elements protects the outer surface of the centrifugal basket. One wear protection element is mounted on the basket shell adjacent to each solids discharge nozzle. The wear protection element is fastened to the basket shell by means of screws and mutually corresponding groove and tongue elements between the basket shell and the wear protection element. The groove of the groove and tongue element is slanted from a groove start at an outer periphery of the basket shell at a distance from the solids discharge nozzle downwardly into the basket shell towards the solids discharge nozzle.

SUMMARY

It has been realised that the wear protection system of the centrifugal separator of EP 1572371 has several disadvantages such as, if the screws holding the wear protection element should be worn down, come loose, or are not mounted, the wear protection element will be thrown out of the groove, which may cause excessive damage to the centrifugal separator. Namely, the direction of the groove, slanting from the nozzle outwardly towards the outer periphery of the separator bowl, promotes propelling of the wear protection element outwardly from the separator bowl if the screws do not hold the wear protection element in place. Accordingly, the screws are an essential part of the wear protection system of EP 1572371.

It would be advantageous to achieve a centrifugal separator overcoming, or at least alleviating, at least some of the above-mentioned drawbacks. In particular, it would be desirable to enable a centrifugal separator comprising wear protection members being less dependent on screws for securing the wear protection members. To better address one or more of these concerns, a centrifugal separator having the features defined in independent claim 1 and/or a protective member as defined in a further independent claim is provided.

According to an aspect of the invention, there is provided a centrifugal separator comprising a separator bowl delimiting therein a separation space and being configured to rotate about a rotational axis and nozzle members arranged peripherally at the separator bowl. Each nozzle member forms a nozzle outlet providing a passage from the separation space to a space outside the separator bowl, and the centrifugal separator comprises a protective member arranged downstream of each nozzle outlet at an outer periphery of the separator bowl. The nozzle member secures the protective member in relation to the separator bowl, at least in one circumferential direction of the separator bowl.

Since the nozzle member secures the protective member in relation to the separator bowl, at least in one circumferential direction of the separator bowl, screws to secure the protective member are either omitted or at least the use of fastening members, such as screws, is not the only means for securing the protective member.

The separator bowl forms a rotor of the centrifugal separator, which may be rotated at several thousand rotations per minute, rpm, during use of the centrifugal separator. Accordingly, the centrifugal separator may be a high-speed centrifugal separator.

The separator bowl may be arranged inside a stationary housing of the centrifugal separator. The separator bowl may be driven to rotate about a vertical axis of rotation by a drive arrangement comprising e.g. an electric motor.

Inside the separation space, separation assisting members such as separation discs may be arranged. Accordingly, the centrifugal separator may be a disc stack centrifugal separator.

The centrifugal separator, during use thereof, is configured for separating a solid matter containing liquid feed mixture into at least a light phase and a sludge phase. The sludge phase is heavier than the light phase and is separated to a periphery of the separation space. The sludge phase is discharged from the separator bowl via the nozzle outlets into a portion of the stationary housing of the centrifugal separator.

The nozzle outlet of each nozzle member is arranged for continuous discharge of separated solid phase.

Each protective member provides wear protection of at least a portion of the outer surface of the separator bowl. As such, the protective member may have better wear resistance than the material of the body of the separator bowl. However, this is not a necessity since the protective members may be replaced when worn down. Accordingly, other and/or additional factors than wear resistance may also be considered in the choice of material, such as cost, available manufacturing methods, machining properties, etc.

The protective member may provide wear protection of the separator bowl not only directly circumferentially downstream of the nozzle outlet but may also protect part of the separator bowl above and below the nozzle outlet. Namely, the jet of separated sludge phase exiting the nozzle outlet may have a conical shape of e.g. up to 45 degrees from a centre axis of the nozzle outlet.

The nozzle outlet of each nozzle member is directed rearwardly in relation to a rotational direction of the separator bowl. That is, a jet of the sludge phase exiting the nozzle outlet during use of the centrifugal separator has at least one directional component extending in parallel to a tangent of the separator bowl, the directional component being directed in an opposite direction to the rotational direction of the separator bowl. Accordingly, downstream of a nozzle outlet is a position behind the nozzle outlet seen along a rotational direction of the separator bowl.

Herein, axial, radial, circumferential, and rotational directions relate to the separator bowl. An axial direction extends in parallel with a rotational axis of the separator bowl and a radial direction extends perpendicularly to the rotational axis. Circumferential and rotational directions extend around the rotational axis.

According to embodiments, the nozzle member may adjoin the protective member and/or may at least partially extends through the protective member in a radial direction of the separator bowl. In this manner, the protective member may be secured by the nozzle member in or at the separator bowl by the nozzle member, at least along a rotational direction of the separator bowl and, according to some embodiments, in a radial direction of the separator bowl.

According to embodiments, a surface of the protective member facing radially inwardly towards a body of the separator bowl is arranged at an angle ($\alpha$) within a range of 0-50 degrees in relation to a tangent of the outer periphery of the separator bowl at the nozzle member, the angle ($\alpha$) having its vertex at the nozzle member. In this manner, the protective member may be secured by the nozzle member in or at the separator bowl by the nozzle member. The angle ($\alpha$) having its vertex at the nozzle member means that the vertex is positioned closer to the nozzle member than a broad end of the angle ($\alpha$).

At an angle of 0 degrees, securing of the protective member by the nozzle member may be achieved along a rotational direction of the separator bowl.

At larger angles, the protective member may extend into the body of the separator bowl. Again, the nozzle member may secure the protective member along a rotational direction of the separator bowl. Additionally, the nozzle member may secure the protective member in a radial direction of the separator bowl. Namely, at larger angles, a related surface of the separator bowl opposite to the surface of the protective member facing towards the body of the separator bowl, comprises a directional component in the radial direction of the separator bowl. Thus, at larger angles, the nozzle member may prevent displacement of the protective member along the related surface and accordingly, along the radial direction of the separator bowl.

According to embodiments, the angle ($\alpha$) may be within a range of 10-50 degrees in relation to the tangent of the outer periphery of the separator bowl, and the protective member may comprise a wedge-shaped body. A vertex end portion of the wedge-shaped body may be configured to be arranged at the nozzle member and an opposite wide end portion of the wedge-shaped body may be configured to be arranged at a distance from the nozzle member, In this manner, the protective member may be arranged to follow an outer contour of the body of the separator bowl and thus, may have an extension along the separator bowl suitable for protection against wear from a sludge phase exiting the separator bowl via the nozzle outlet during use of the centrifugal separator.

More specifically, in the range of >0-50 degrees of the angle ($\alpha$), such as 10-50 degrees, the separator bowl may be provided with a recess in which the protective member may be received. The wedge-shaped body of the protective member may be positioned in the recess Thus, with a corresponding angle of the wedge-shape of the protective member, the radially outer surface of the protective member may have an extension substantially along an outer surface of the separator bowl. Naturally, the radially outer surface of the wedge-shaped body of the protective member may be curved with the same radius as the outer surface of the separator bowl in the axial location of the nozzle member.

The vertex end portion of the wedge-shaped body being arranged at the nozzle member and the wide end portion of the wedge-shaped body being arranged at a distance from the nozzle member means that the vertex end portion is arranged closer to the nozzle member than the wide end portion.

According to embodiments, the protective member may be arranged in a slot extending from the nozzle member into the body of the separator bowl. In this manner, the protective member may be positioned in the separator bowl.

The slot forms a recess in the body of the separator bowl and may be sized such that the wedge-shaped body of the protective member fits into the slot and substantially fills the slot.

According to a further aspect of the invention, there is provided a protective member for a centrifugal separator according to aspects and/or embodiments discussed herein, the protective member comprising a wedge-shaped body, a vertex end portion of the wedge-shaped body being configured to be arranged at the nozzle member and an opposite wide end portion of the wedge-shaped body being configured to be arranged at a distance from the nozzle member. The protective member may further comprise a relief surface extending in the direction between the vertex end portion and the opposite wide end portion.

Since the vertex end portion of the wedge-shaped body is configured to be arranged at the nozzle member and the wide end portion of the wedge-shaped body is configured to be arranged at a distance from the nozzle member, the protective member is shaped such that, when mounted in the separator bowl of the centrifugal separator, the nozzle member secures the protective member in relation to the separator bowl. Thus, screws to secure the protective member can be omitted. Further, the relief surface facilitates for the protective member to be slotted into a mating structure in the centrifuge bowl. The relief surface may thus form a path for slidingly receiving a tab structure on the outer surface of the separator bowl.

In embodiments of this aspect, the relief surface extends on two opposite side surfaces of the protective member. When arranged in the separator bowl, the opposite side surfaces may have a normal extending substantially in the direction of the rotational axis.

According to a further aspect of the invention, there is provided a protective member for a centrifugal separator according to aspects and/or embodiments discussed herein, the protective member comprising a sheet arranged along an outer periphery of the separator bowl.

Such a protective member in the form of a sheet may be utilised in embodiments of the centrifugal separator wherein the surface of the protective member facing towards the body of the separator bowl is arranged at an angle ($\alpha$) of 0 degrees in relation to a tangent of an outer periphery of the separator bowl.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
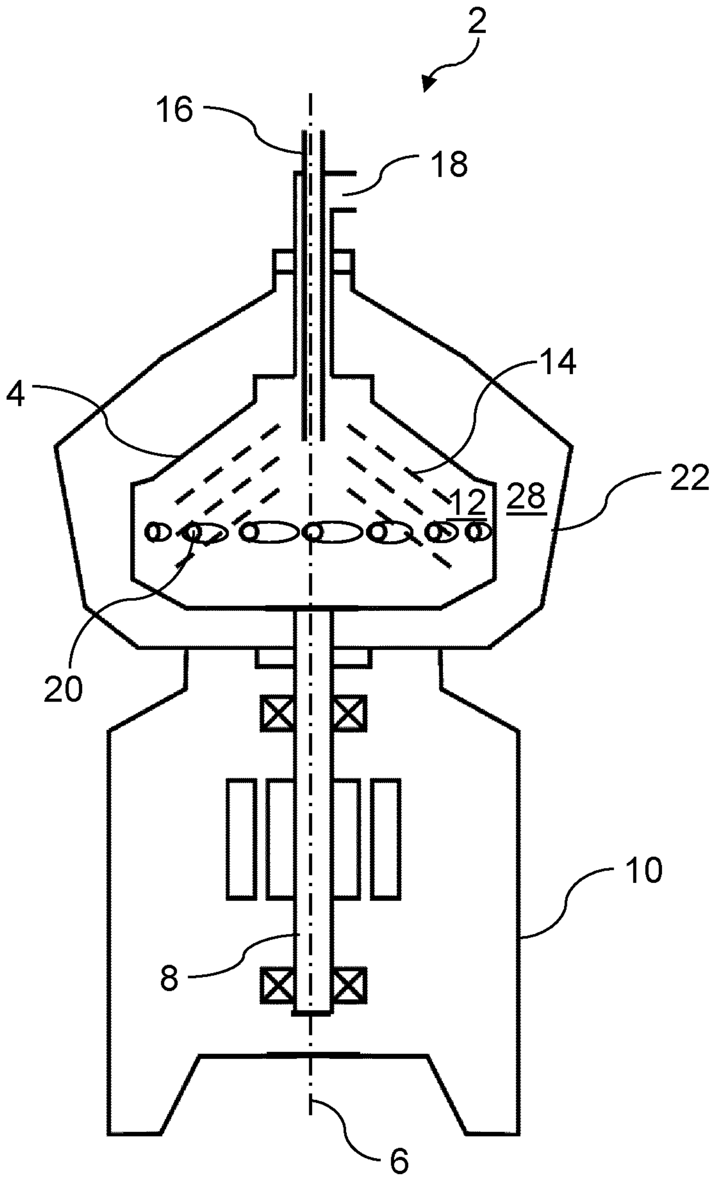
FIG. 1 schematically illustrates a cross section through a centrifugal separator according to embodiments, FIGS. 2_a_-2_c_ illustrate views of a separator bowl, FIGS. 3_a_-3_c_ illustrate a protective member according to embodiments, FIGS. 4_a_ and 4_b_ illustrate partial views of a separator bowl.

FIG. 1 schematically illustrates a cross section through a centrifugal separator 2 according to embodiments. The centrifugal separator 2 is a high-speed separator provided with nozzle outlets for a separated sludge phase from a separator bowl 4 of the centrifugal separator. The centrifugal separator 2 may be any such separator, the basic features of which will be described with reference to FIG. 1.

Accordingly, the centrifugal separator 2 comprises a separator bowl 4 being configured to rotate about a rotational axis 6. The separator bowl 4 is mounted on a spindle 8. The spindle 8 is supported in a stationary housing 10 of the centrifugal separator 2, e.g. via two bearings.

A drive arrangement is configured to rotate the spindle 8 and the separator bowl 4 about the rotational axis 6.

In the illustrated embodiments, the spindle 8 forms part of the drive arrangement. The drive arrangement comprises an electric motor and a rotor of the electric motor forms part of the spindle 8. In alternative embodiments, the drive arrangement may instead be connected to the spindle 8. Such alternative embodiments may comprise an electric motor connected via a transmission, e.g. comprising cog wheels or a belt drive, to the spindle 8.

The separator bowl 4 delimits therein a separation space 12. In the separation space 12 there may be arranged a separation aid configured to improve separation of liquid mixture. The separation aid, schematically indicated in the illustrated embodiments, comprises a stack of frusto-conical separation discs 14. The separation discs 14 provide for an efficient separation of the liquid mixture into at least a light phase and a sludge phase during use of the centrifugal separator 2. The stack of frusto-conical separation discs 14 is fitted coaxially with the rotational axis 6.

The centrifugal separator 2 further comprises an inlet 16 for the liquid mixture and a light phase outlet 18 for the separated light phase. In the illustrated embodiments the inlet 16 and the light phase outlet 18 are arranged at an upper end of the separator bowl 4. One or both of the inlet 16 and the light phase outlet 18 may alternatively be arranged at a lower end of the separator bowl 4.

A number of nozzle members 20 for discharging the separated sludge phase from the separation space 12 and the separator bowl 4 are arranged at a periphery of the separator bowl 4. The number of nozzle members 20 may be, e.g. 7-28.

The housing 10 may comprise a number of individual parts and thus, may be assembled 35 from several parts. In particular, the housing 10 may comprise a hood 22 enclosing the separator bowl 4. From the nozzle members 20, the sludge phase is discharged into a space 28 outside the separator bowl 4. The space 28 is formed between the bowl 4 and the hood 22. The sludge phase is lead out from the space 28 via a non-shown sludge outlet.

During use of the centrifugal separator 2 the separator bowl 4 is rotated at high speed, such as several thousands of rpm, and a solid matter containing liquid mixture is conducted via the inlet 16 to the centre of the separator bowl 4 and from there into the separation space 12. The solid matter takes the form of small particles suspended in the liquid mixture. The liquid mixture may comprise one or more liquids. That is, in addition to the solid matter and a first liquid, the liquid mixture may comprise a further liquid of higher density than the first liquid. The liquid mixture is separated into the light phase and the sludge phase in the stack of frusto-conical separation discs 14. The light phase is a liquid substantially free of any solid matter and the sludge phase is a solid matter containing liquid.

The separated light phase flows radially inwardly between the separation discs 14 towards the vertical axis 6 of rotation and out of the separator bowl 4 via the light phase outlet 18. The separated solid matter is transported radially outwardly between the separation discs 14 towards a periphery of the separation space 12. The solid matter flows out of the separator bowl 4 as a part of the sludge phase via the nozzle members 20 arranged at the periphery of the separator bowl 4. In addition to the solid matter, the sludge phase may include one or more of the light phase and/or a separated heavy liquid phase. The nozzle members 20 form an open passage from the separation space 12 to the space 28 outside the bowl 4.

If the solid matter has abrasive properties, the sludge phase may subject an outer surface of the separator bowl 4 to wear adjacent to the nozzle members 20. Thus, the centrifugal separator 2 comprises wear protection measures, which now will be discussed with reference to FIGS. 2*a*-6*d*.

Figure 2A:
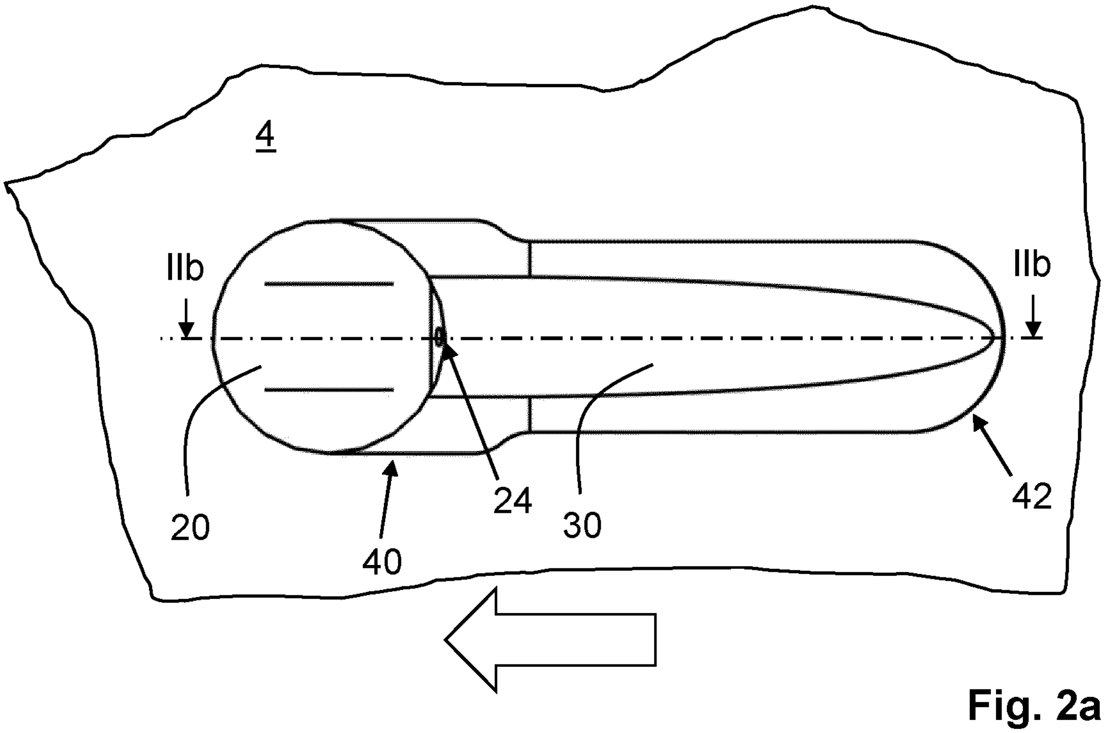
Figure 2B:
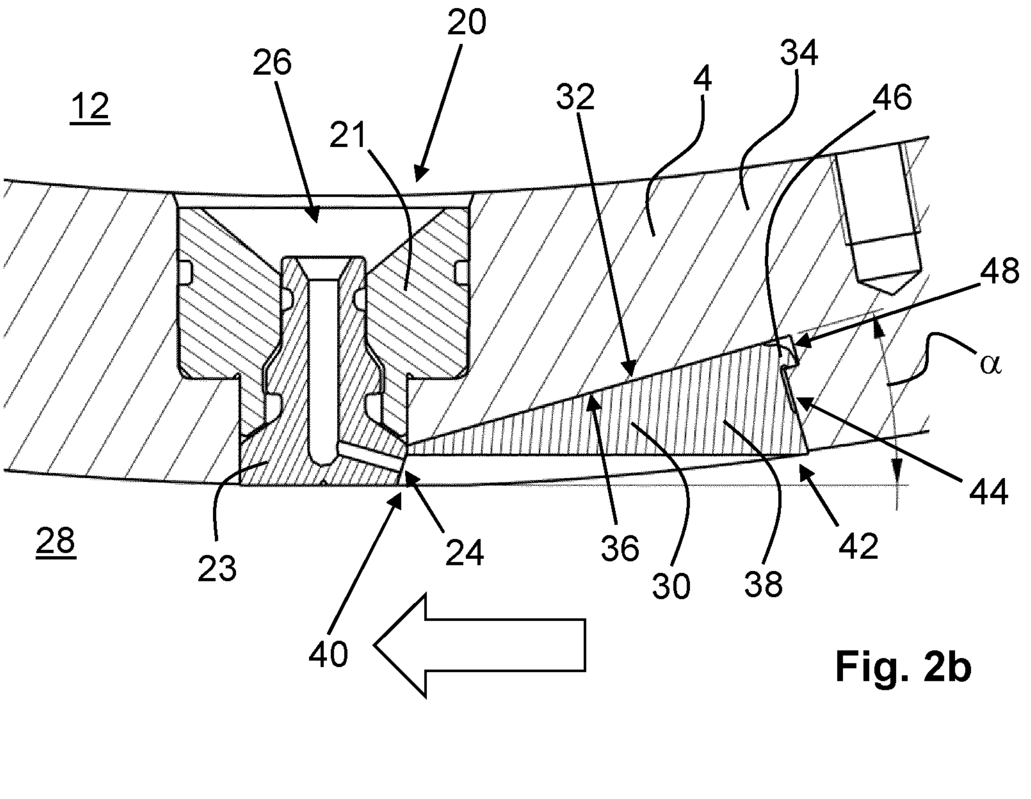
Figure 2C:
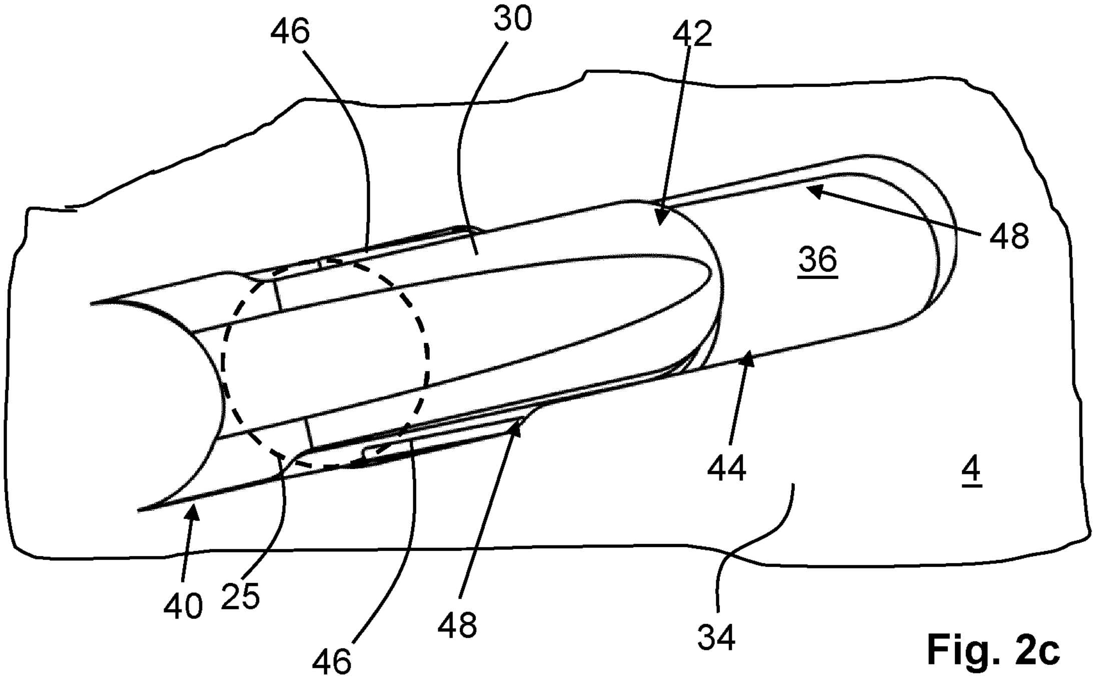

FIGS. 2*a* and 2*c* illustrate partial views of a separator bowl 4, such as a separator bowl 4 of the centrifugal separator 2 discussed above with reference to FIG. 1. FIG. 2*b* illustrates a cross section through a portion of the separator bowl 4 along line IIb-IIb in FIG. 2*a*.

The separator bowl 4 is provided with peripherally arranged nozzle members 20. In FIGS. 2*a* and 2*b* one of the nozzle members 20 is shown. The nozzle member 20 forms a nozzle outlet 24 providing a passage 26 from the separation space 12 to a space 28 outside the separator bowl 4. The passage 26 is always open. That is, the nozzle member 20, the nozzle outlet 24 and the passage 26 are arranged for continuous discharge of solid phase.

The invention is not limited to any particular kind of nozzle member. In these embodiments, the nozzle member 20 comprises two main portions, an inner portion 21 and an outer portion 23. The outer portion 23 includes a radially outer portion of the passage 26 and the nozzle outlet 24 and may be made from a wear resistant material, such as a carbide or tungsten. The outer portion 24 may be exchangeable from an outside of the separator bowl 4 and may be fastened via e.g. a bayonet coupling to the inner portion 21. Alternatively, the nozzle member may comprise only one part or more than two parts. For instance, nozzle member may comprise only one part or more than two parts. For instance, the nozzle outlet 24 may be provided in a separate exchangeable part, which may be fitted in the outer portion 23 of the nozzle member 20 shown in the illustrated embodiments or in a different kind of nozzle member.

A protective member 30 is arranged downstream of each nozzle outlet 24 at an outer periphery of the separator bowl 4.

In FIGS. 2*a* and 2*b*, the rotational direction of the separator bowl is indicated with a broad arrow. The nozzle outlet 24 of each nozzle member 20 is directed rearwardly in relation to the rotational direction of the separator bowl 4. Downstream the nozzle outlet 24 is thus, behind the nozzle outlet 24 seen along the rotational direction of the separator bowl 4. The nozzle outlet 24 may be directed rearwardly at a right angle to a radial direction of the separator bowl 4 or at an acute angle to the radial direction as shown in FIG. 2*b*. Accordingly, the jet of the sludge phase discharged through the nozzle outlet 24 has at least one directional component extending in parallel to a tangent of the separator bowl 4.

The protective member 30 is arranged on the separator bowl 4 to protect the outer surface of the separator bowl 4 against wear from abrasive sludge phase discharged from the nozzle outlet 24. The protective member 30 is exchangeable. Accordingly, if worn, the protective member 30 may be exchanged for an unworn protective member 30. The body of the separator bowl 4 does not wear or at least does wear to a considerably lesser degree than if it were not provided with the protective member 30.

The nozzle member 20 secures the protective member 30 in relation to the separator bowl 4.

FIG. 2*c* shows the protective member 30 being about to be positioned in its dedicated position at the outer periphery of the separator bowl 4.

Mounting of a new protective member 30 is performed by positioning it in its dedicated position at the outer periphery of the separator bowl 4 while the nozzle member 20, or at least part thereof such as the outer portion 23, is removed from the separator bowl 4. In FIG. 2*c* the protective member 30 is partially positioned, still covering the opening 25 (indicated with a broken line) in the separator bowl 4, into which the outer portion 23 of the nozzle member 20 fits. Once the protective member 30 is in position, the nozzle member 20 is mounted in the separator bowl 4, such as the outer portion 23 of the nozzle member 20 being mounted in its inner portion 21. The nozzle member 20 prevents the protective member 30 from coming loose from the separator bowl 4.

In embodiments, wherein the nozzle member 20 comprises the inner portion 21 and the outer portion 23, as in the illustrated embodiments, the outer portion 23 of the protective member 30 secures the protective member 30 in relation to the separator bowl 4.

In some embodiments, such as the embodiments illustrated in FIGS. 2*a*-2*c*, there is no additional member required for securing the protective member 30 to the separator bowl 4.

The nozzle member 20 adjoins the protective member 30. Thus, the nozzle member 20 prevents the protective member 30 from moving beyond the nozzle member 20 and secures the protective member 30 to the separator bowl 4. The nozzle member 20 may be arranged in adjoining abutment with the protective member 30 to ensure secure positioning of the protective member 30.

According to some embodiments, such as those illustrated in FIGS. 2*a*-2*c*, a surface 32 of the protective member 30 facing radially inwardly towards a body 34 of the separator bowl 4 is arranged at an angle α within a range of 10-50 degrees in relation to a tangent of the outer periphery of the separator bowl 4 at the nozzle member 20. The angle α has its vertex at the nozzle member 20. Accordingly, the protective member 30 extends into the body 34 of the separator bowl 4.

A related surface 36 of the body 34 of the separator bowl 4, opposite to the surface 32 of the protective member 30 facing towards the body 34 of the separator bowl 4, comprises a directional component along a radial direction of the separator bowl 4. Thus, in these embodiments, the nozzle member 20 secures the protective member 30 along a rotational direction of the separator bowl 4 as well as along the radial direction of the separator bowl 4. Put differently, the nozzle member 20 prevents displacement of the protective member 30 along the related surface 36 of the separator bowl 4.

The protective member 30 is arranged in a slot 44 extending from the nozzle member 20 into the body 34 of the separator bowl 4. The protective member 30 positioned in the slot 44 is thus, arranged in the body 34 of the separator bowl 4.

The related surface 36 of the body 34 of the separator bowl 4 forms a radially inner surface of the slot 44.

According to these embodiments, the protective member 30 comprises a wedge-shaped body 38. A vertex end portion 40 of the wedge-shaped body 38 is configured to be arranged at the nozzle member 20 and an opposite wide end portion 42 of the wedge-shaped body 38 is configured to be arranged at a distance from the nozzle member 20. The protective member 30 is thus, devised to widen in a direction downstream of the nozzle outlet 24. The wedge-shaped body 38 may have a curved outer surface to generally follow the outer radius of the separator bowl 4.

The wedge-shaped body 38 of the protective member 30 may comprises at least one lateral projection 46 and the body 34 of the separator bowl 4 may be provided with at least one groove 48 extending substantially perpendicularly to the slot 44. The at least one lateral projection 46 engages with the at least one groove 48. Due to the lateral projection 46, a relief surface 52 is formed that facilitates a slidingly engagement of the protective member 30 with the separator bowl 4. In this manner, the at least one lateral projection 46 engaging with the at least one groove 48 contributes to securing the protective member 30 to the separator bowl 4 in the slot 44.

In FIG. 2*c* it is shown how the lateral projection 46 extending around part of the body 38 of the protective member 30 is inserted and slid into the groove 48 extending around the perimeter of the slot 44.

The nozzle outlet 24 may be arranged inside the outer periphery of the separator bowl 4. In this manner, the nozzle member 20 may be arranged, at least to a large extent, within the outer periphery of the separator bowl 4. Thus, it is avoided that the nozzle member 20 causes noise during high speed rotation of the separator bowl 4. Such noise would occur if the nozzle member 20 extends beyond the outer periphery of the separator bowl 4 to a certain extent.

Figure 3A:
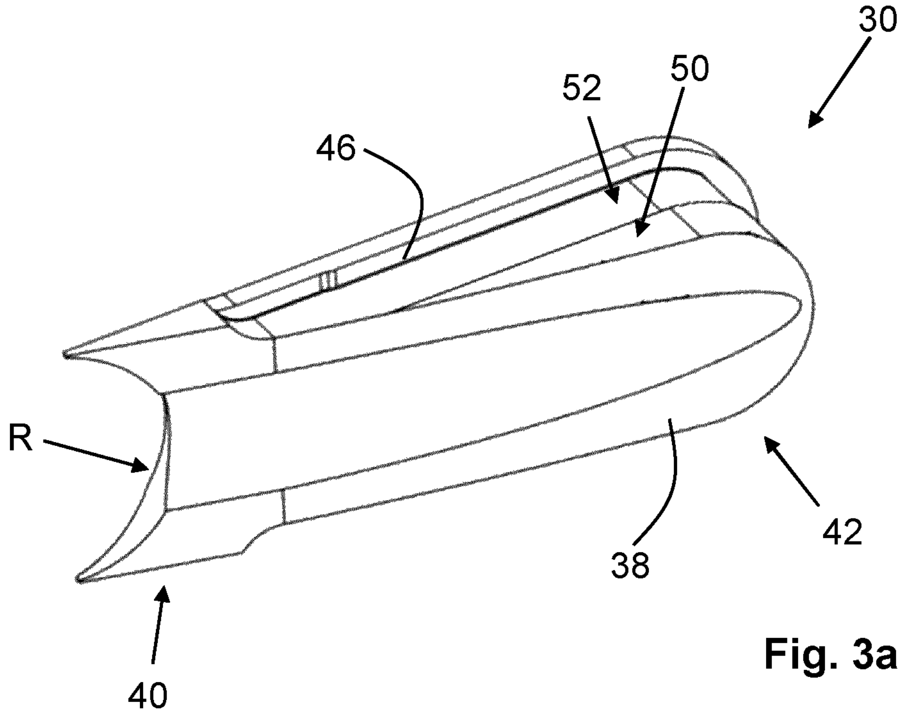
Figure 3B:
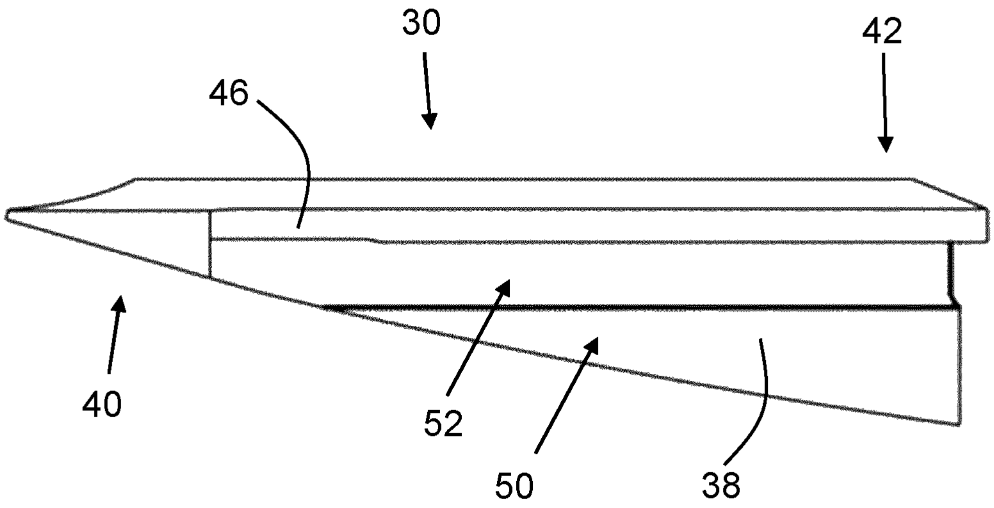
Figure 3C:
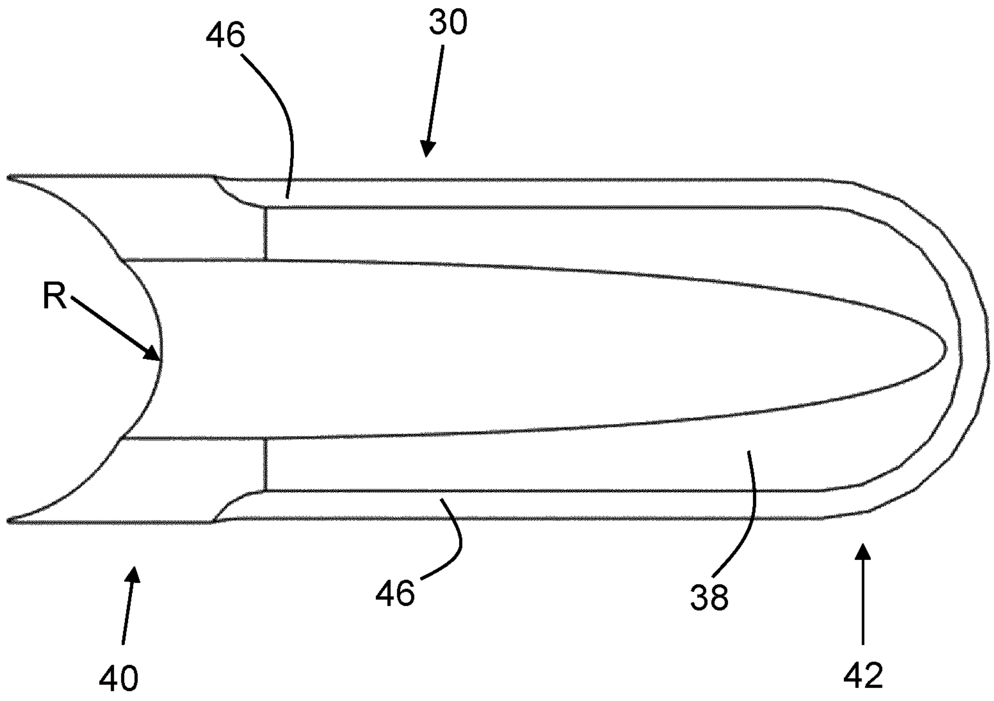

FIGS. 3*a*-3*c* illustrate a protective member 30 according to embodiments. The protective member 30 may be a protective member 30 as discussed above with reference to FIGS. 2*a*-2*c*.

The protective member 30 is provided for a centrifugal separator according to aspects and/or embodiments discussed herein. The protective member 30 comprising a wedge-shaped body 38. A vertex end portion 40 of the wedge-shaped body 38 is configured to be arranged at a nozzle member of a separator bowl of the centrifugal separator. An opposite wide end portion 42 of the wedge-shaped body 38 is configured to be arranged at a distance from the nozzle member. The protective member 30 further comprises a relief surface 52 extending in the direction between the vertex end portion 40 and the opposite wide end portion 42. The relief surface 52 extends around the circumference of the wide end portion 42. Thus, it extends in this example on two opposite side surfaces of the protective member 30. The relief surface 52 is in the form so as to be able to mate with a mating structure of the centrifuge bowl. For example, the protective member 30 may have a relief surface formed between lateral projections so that the protective member 30 may be slotted into place in the centrifuge bowl, as discussed in relation to FIG. 2*b* and FIG. 2*c* above.

More specifically, the vertex end portion 40 of the wedge-shaped body 38 has an outer contour, which is shaped such that it is configured to border to the nozzle member. In the illustrated embodiments, the outer contour has a radius R adapted to a radius of the relevant nozzle member. Accordingly, the vertex end portion 40 of the wedge-shaped body 38 may be arranged in adjoining abutment with the nozzle member.

The opposite wide end portion 42 of the wedge-shaped body 38 is configured to be arranged at a distance from the nozzle member firstly, due to the fact that it is arranged opposite to the vertex end portion 40. Secondly, the opposite wide end portion 42 may be shaped such that it fits into a slot in the separator bowl. In the illustrated embodiments, the opposite wide end portion 42 has an outer contour adapted to an inner end portion of the slot in the separator bowl. For instance, the wide end portion 42 of the wedge-shaped body 38 may have a rounded outer contour perpendicular to the wedge-shape.

The wedge-shaped body 38 may comprise at least one lateral projection 46. In this manner, the at least one projection 46 may engage with a corresponding groove in a body of the separator bowl. Thus, the protective member 30 may be devised for being held by the at least one lateral projection 46 in the separator bowl, as discussed above inter alia with reference to FIG. 2*c*.

The wedge-shaped body 38 of the protective member 30 may comprise a surface portion 50 extending perpendicularly to the at least one lateral projection 46. The relief surface 52 may be arranged between the at least one lateral projection 46 and the surface portion 50 extending perpendicularly to the at least one lateral projection 46. In this manner, manufacturing of the protective member 30 may be facilitated. Namely, by providing the relief surface 52 between the lateral projection 46 and the surface portion 50 extending perpendicularly to the lateral projection 46, the surface portion 50 may be shaped without a transition between the lateral projection 46 and the surface portion 50 impeding such shaping.

The relief surface 52 forms part of a recess into the body 38 of the protective member 30 between the at least one lateral projection 46 and the surface portion 50.

The wedge-shaped body 38 of the protective member 30 may be produced by additive manufacturing. In this manner, a complex shape of the protective member 30 may be produced. Moreover, the protective member 30 may be manufactured from wear resistant materials, which may be difficult to subject to machining.

The final tolerances of e.g. the lateral projection 46 and the surface portion 50 may be achieved after additive manufacturing, e.g. by grinding.

Alternatively, the wedge-shaped body 38 of the protective member 30 may be produced by any other suitable manufacturing method, such as casting, machining, etc.

Figure 4A:
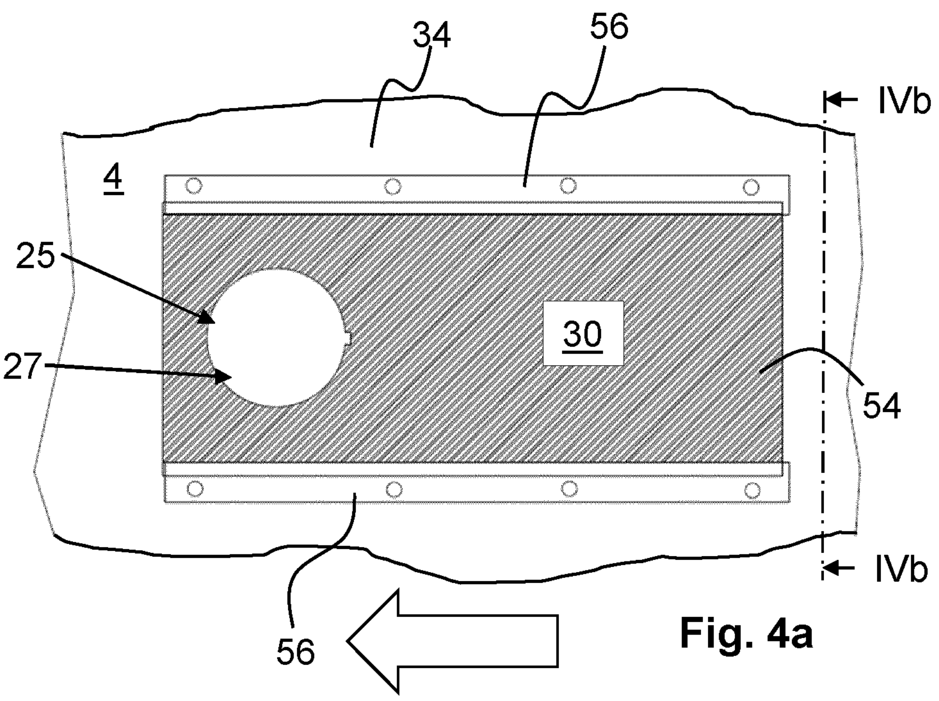
Figure 4B:
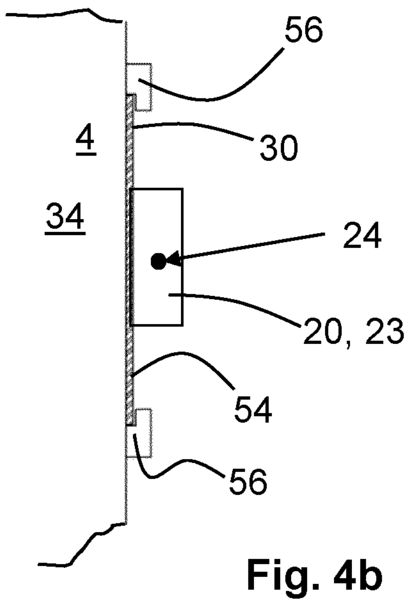

FIGS. 4*a* and 4*b* illustrate partial views of a separator bowl 4, such as a separator bowl 4 of the centrifugal separator 2 discussed above with reference to FIG. 1. FIG. 4*a* shows a front view and FIG. 4*b* shows a side view of the separator bowl 4 along line IVb-Ivb in FIG. 4*a*.

Again, the separator bowl 4 is provided with peripherally arranged nozzle members 20. Each nozzle member 20 forms a nozzle outlet 24 providing a passage from the separation space inside the separation bowl 4 to a space outside the separator bowl 4. A protective member 30 (marked with hatchings) is arranged downstream of each nozzle outlet 24 at an outer periphery of the separator bowl 4.

In FIG. 4*a* an opening 25 in the separator bowl 4, into which at least part of the nozzle member 20 fits is shown. A corresponding opening 27 for the nozzle member 20 is provided in the protective member 30. In FIG. 4*b*, the nozzle member 20 is shown mounted in the separator bowl 4.

According to these embodiments, the protective member 30 comprises a sheet 54 arranged along the outer periphery of the separator bowl 4. The sheet 54 protects the outer surface of the separator bowl 4 against wear. The sheet 54 may be a sheet metal with good abrasive properties.

Accordingly, a surface 32 of the protective member 30 facing radially inwardly towards a body 34 of the separator bowl 4 is arranged at an angle of 0 degrees in relation to a tangent of the outer periphery of the separator bowl 4 at the nozzle member 20.

Again, the nozzle member 20 secures the protective member 30 in relation to the separator bowl 4. In these embodiments, the nozzle member 20 secures the protective member 30 in the circumferential direction of the separator bowl 4, i.e. along a rotational direction of the separator bowl 4. This is achieved by the nozzle member 20 at least partially extending through the protective member 30 in a radial direction of the separator bowl 4.

Once the protective member 30 is in position, the nozzle member 20 is mounted in the separator bowl 4, such as the outer portion 23 of the nozzle member 20 being mounted in its inner portion 21.

More specifically, first the protective member 30 is positioned on the outer periphery of the separator bowl 4 and then the nozzle member 20, such as an outer portion 23 of the nozzle member 20, is mounted in the separator bowl 4. The nozzle member 20, when mounted in the opening 25 of the separator bowl 4 extends at least partially through the opening 27 provided through the sheet 54 of the protective member 30. Thus, the nozzle member 20 secures the protective member 30 in the circumferential direction of the separator bowl 4.

Again, it may be the outer portion 23 of the protective member 30 that secures the protective member 30 in relation to the separator bowl 4.

According to some embodiments, the nozzle member may be at least partially secured in a radial direction of the separator bowl by the protective member. For instance, the nozzle member may engage with the protective member via a bayonet coupling. Since the nozzle member extends into the body of the separator bowl, radially inside the protective member, also in such embodiments, the nozzle member secures the protective member in a circumferential direction of the separator bowl.

The nozzle outlet 24 is arranged outside the outer periphery of the separator bowl 4 and radially outside the protective member 30. In this manner, the nozzle outlet 24 is positioned for unimpeded ejection of the sludge phase through the nozzle outlet 24 into the space outside the separator bowl 4.

The protective member 30 is secured in a radial direction of the separator bowl 4 with at least two fastening elements 56 at the outer periphery of the separator bowl 4. In this manner, the protective member 30 is held in position at the outer periphery of the separator bowl 4 together with the nozzle member 20, in radial and circumferential directions.

In these embodiments, the at least two fastening elements 56 comprise two rails attached to the outer periphery of the separator bowl 4 axially above and below the opening 25 for the nozzle member 20. The protective member 30 is slid under the two rails. Thus, the securing in the radial direction of the protective member 30 is achieved.

The protective member 30 extends outside the nozzle member 20 in an axial direction of the separator bowl 4. In this manner, a broad area of the outer surface of the separator bowl 4, in the axial direction, may be protected by the protective member 30. This may be advantageous if the nozzle outlet 24 is worn to such a degree that the jet of the sludge phase ejected through the nozzle outlet 24 has a wide spray angle.

Figure 5:
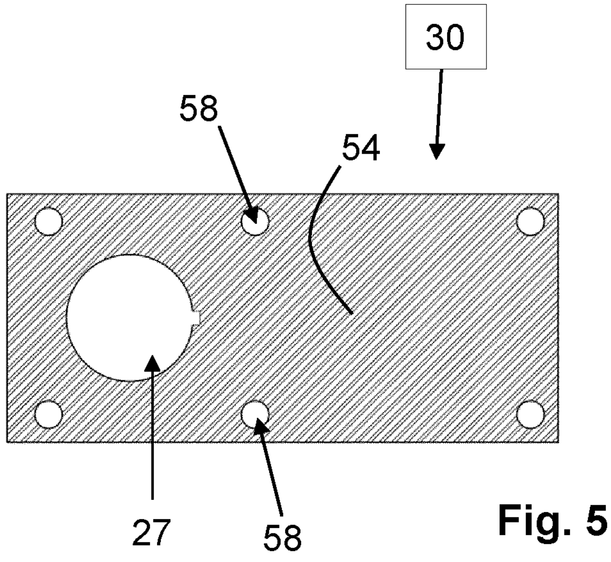
FIG. 5 illustrates embodiments of a protective member.

FIG. 5 illustrates embodiments of a protective member 30. The protective member 30 resembles in much the protective member 30 discussed above with reference to FIGS. 4*a* and 4*b*.

Again, the protective member 30 comprises a sheet 54. The sheet 54 of the protective member 30 is configured to be arranged along the outer periphery of a separator bowl.

Again, the nozzle member (not shown) secures the protective member 30 in the circumferential direction of the separator bowl. Again, the protective member 30 is secured in the radial direction of the separator bowl with at least two fastening elements at the outer periphery of the separator bowl 4.

In these embodiments, the at least two fastening elements comprise a number of screws (not shown), which extended through holes 58 provided in the sheet 54. Although in these embodiments, screws are relied upon to secure the protective member 30 in a radial direction of the separator bowl, the protective member 30 is secured in a circumferential direction by the nozzle member extending through the opening 27 in the sheet 54.

Figure 6A:
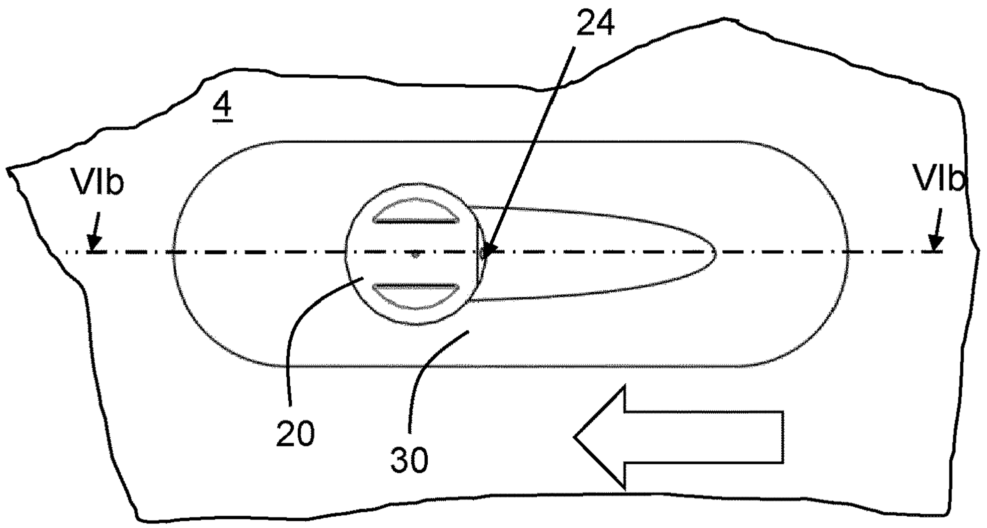
FIGS. 6*a*-6*d* illustrate a separator bowl and a protective member according to embodiments.
Figure 6B:
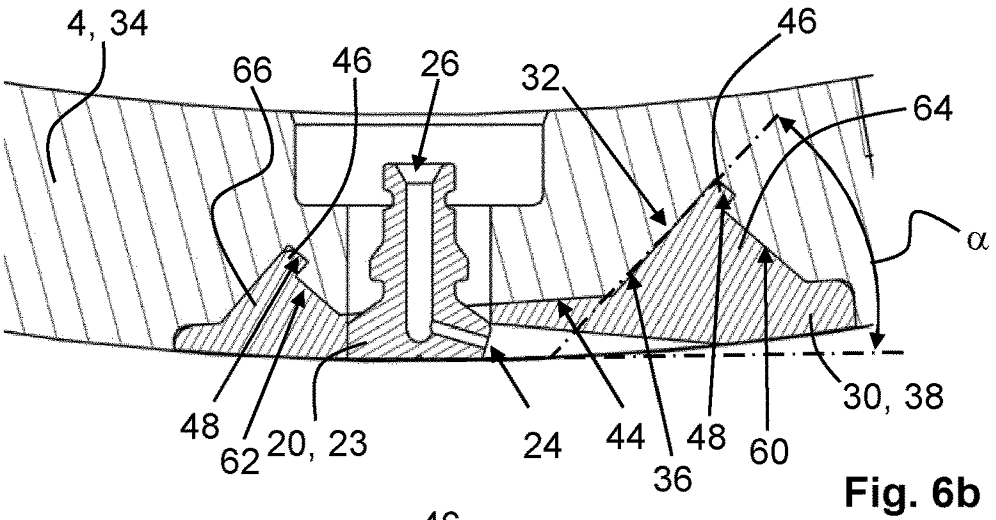
Figure 6C:
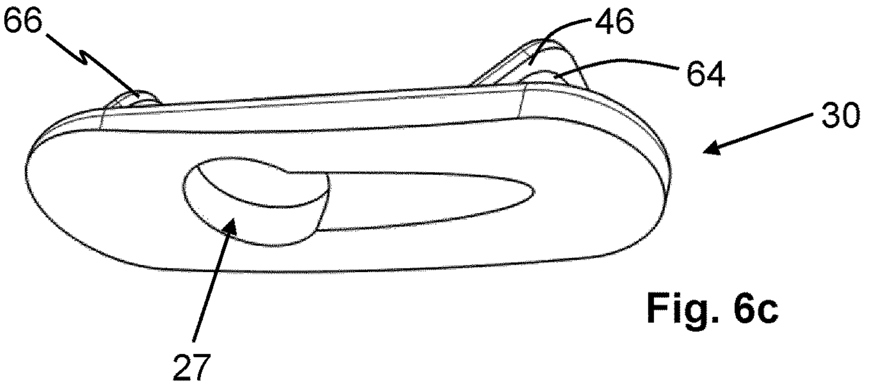
Figure 6D:
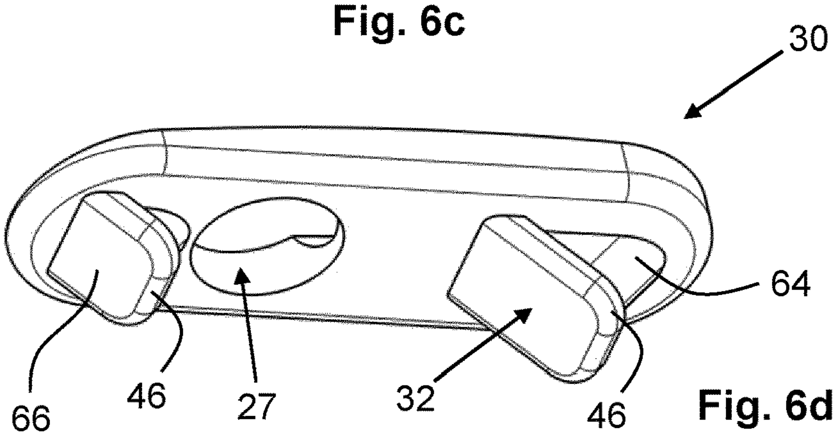

FIGS. 6*a*-6*d* illustrate a separator bowl 4 and a protective member 30 according to embodiments. FIG. 6*a* illustrates a partial view of the separator bowl 4, such as a separator bowl 4 of the centrifugal separator 2 discussed above with reference to FIG. 1. FIG. 6*b* illustrates a cross section through a portion of the separator bowl 4 along line VIb-VIb in FIG. 6*a*. FIGS. 6*c* and 6*d* illustrate two perspective views of the protective member 30. The protective member 30 of these embodiments resembles in much the protective member 30 according to the embodiments discussed above with reference to FIGS. 2*a*-3*c*. Also, the manner in which the protective member 30 is connected to the separator bowl 4 resembles in much the manner discussed above with reference to FIGS. 2*a*-3*c*. Accordingly, in the following, mainly the differences between these embodiments and those of FIGS. 2*a*-3*c* will be discussed.

Again, the separator bowl 4 is provided with peripherally arranged nozzle members 20. In FIGS. 6*a* and 6*b* an outer portion 23 of the nozzle members 20 is shown. The nozzle member 20 forms a nozzle outlet 24 providing a passage 26. A protective member 30 is arranged downstream of each nozzle outlet 24 at an outer periphery of the separator bowl 4.

Again, the nozzle member 20 secures the protective member 30 in relation to the separator bowl 4. There is no additional member required for securing the protective member 30 to the separator bowl 4.

The nozzle member 20 extends partially trough the protective member 30. An opening 27 is provided in the protective member 30 through which part of the nozzle member 20 extends. Thus, the nozzle member 20 prevents the protective member 30 from moving in a circumferential direction of the separator bowl 4.

Moreover, the body 34 of the separator bowl 4 is provided with a slot 44 extending around the nozzle member 20. The protective member 30 is positioned in the slot 44.

A body 38 of the protective member 30 comprises two protrusions 64, 66. The slot 44 comprises two recesses 60, 62. Each of the two protrusions 64, 66 has a form mating with a respective shape of the two recesses 60, 62.

The body 38 of the protective member 30, more specifically, each of the two protrusions 64, 66 comprises a lateral projection 46. The body 34 of the separator bowl 4, in each of the recesses 60, 62, is provided with a groove 48 extending substantially perpendicularly to the slot 44. The lateral projections 46 engage with the grooves 48. This engagement between the projections 46 and the grooves 48 contributes to securing the protective member 30 to the separator bowl 4 in the slot 44.

Again, a surface 32 of the protective member 30 facing radially inwardly towards the body 34 of the separator bowl 4 is arranged at an angle α within a range of 10-50 degrees in relation to a tangent of the outer periphery of the separator bowl 4 at the nozzle member 20. The angle α has its vertex at the nozzle member 20, i.e. in a region of the nozzle member 20. The surface 32 may be a surface of one of the protrusions 60, 62.

A related surface 36 of the body 34 of the separator bowl 4, opposite to the surface 32 of the protective member 30 facing towards the body 34 of the separator bowl 4, comprises a directional component along a radial direction of the separator bowl 4. Thus, the nozzle member 20 secures the protective member 30 along a rotational direction of the separator bowl 4 as well as along the radial direction of the separator bowl 4.

Again, the nozzle outlet 24 is arranged inside the outer periphery of the separator bowl 4.

The protective member 30 extends outside the nozzle member 20 in an axial direction of the separator bowl 4. In this manner, a broad area of the outer surface of the separator bowl 4, in the axial direction, may be protected against wear by the protective member 30. This may be advantageous if the nozzle outlet 24 is worn to such a degree that the jet of the sludge phase ejected through the nozzle outlet 24 has a wide spray angle.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A centrifugal separator comprising:

a separator bowl delimiting therein a separation space and being configured to rotate about a rotational axis;

nozzle members arranged peripherally at the separator bowl, wherein each of the nozzle members forms a nozzle outlet providing a passage from the separation space to a space outside the separator bowl;

a protective member arranged downstream of each of the nozzle outlets at an outer periphery of the separator bowl, wherein each of the nozzle members respectively secures the protective member in relation to the separator bowl, at least in one circumferential direction of the separator bowl, and wherein the protective member comprises a wedge-shaped body including a vertex end portion configured to be arranged at a respective nozzle member of the nozzle members and an opposite wide end portion configured to be arranged at a distance from the respective nozzle member.

2. The centrifugal separator according to claim 1, wherein each of the nozzle members respectively adjoins the protective member and/or at least partially extends through the protective member in a radial direction of the separator bowl.

3. The centrifugal separator according to claim 1, wherein a surface of the protective member facing radially inwardly towards a body of the separator bowl is arranged at an angle within a range of 0-50 degrees in relation to a tangent of the outer periphery of the separator bowl at the respective nozzle member of the nozzle members, the angle having a vertex thereof at the respective nozzle member.

4. The centrifugal separator according to claim 3, wherein the angle is within a range of 10-50 degrees in relation to the tangent of the outer periphery of the separator bowl.

5. The centrifugal separator according to claim 1, wherein the protective member is arranged in a slot extending from the respective nozzle member of the nozzle members into a body of the separator bowl.

6. The centrifugal separator according to claim 4, wherein the wedge-shaped body of the protective member further comprises at least one lateral projection and a body of the separator bowl is provided with at least one groove extending substantially perpendicularly to a slot, and wherein the at least one lateral projection engages with the at least one groove.

7. The centrifugal separator according to claim 1, wherein the nozzle outlet is arranged inside the outer periphery of the separator bowl.

8. The centrifugal separator according to claim 1, wherein the protective member further comprises a sheet arranged along the outer periphery of the separator bowl.

9. The centrifugal separator according to claim 8, wherein the protective member is secured in a radial direction of the separator bowl with at least two fastening elements at the outer periphery of the separator bowl.

10. The centrifugal separator according to claim 8, wherein the nozzle outlet is arranged at least partially outside the outer periphery of the separator bowl and radially outside the protective member.

11. The centrifugal separator according to claim 1, wherein the protective member extends outside the respective nozzle member of the nozzle members in an axial direction of the separator bowl.

12. The centrifugal separator according to claim 1, wherein the protective member further comprises a relief surface extending in a direction between the vertex end portion and the opposite wide end portion.

13. The centrifugal separator according to claim 12, wherein the relief surface extends on two opposite side surfaces of the protective member.

14. The centrifugal separator according to claim 12, wherein the wedge-shaped body comprises at least one lateral projection.

15. The centrifugal separator according to claim 14, wherein the wedge-shaped body comprises a surface portion extending perpendicularly to the at least one lateral projection, and wherein said relief surface is arranged between the at least one lateral projection and the surface portion extending perpendicularly to the at least one lateral projection.

16. The centrifugal separator according to claim 12, wherein the wedge-shaped body is produced by additive manufacturing.

17. The centrifugal separator according to claim 2, wherein a surface of the protective member facing radially inwardly towards a body of the separator bowl is arranged at an angle within a range of 0-50 degrees in relation to a tangent of the outer periphery of the separator bowl at the respective nozzle member of the nozzle members, the angle having a vertex thereof at the respective nozzle member.

18. The centrifugal separator according to claim 2, wherein the protective member is arranged in a slot extending from the respective nozzle member of the nozzle members into a body of the separator bowl.

19. The centrifugal separator according to claim 3, wherein the protective member is arranged in a slot extending from the respective nozzle member of the nozzle members into a body of the separator bowl.

20. The centrifugal separator according to claim 4, wherein the protective member is arranged in a slot extending from the respective nozzle member of the nozzle members into a body of the separator bowl.

* * * * *